United States Patent [19]

Fernadez

[11] Patent Number: 5,235,166
[45] Date of Patent: Aug. 10, 1993

[54] DATA VERIFICATION METHOD AND MAGNETIC MEDIA THEREFOR

[75] Inventor: Alberto J. Fernadez, Miami, Fla.

[73] Assignee: XTec Incorporated, Miami, Fla.

[21] Appl. No.: 655,546

[22] Filed: Feb. 14, 1991

[51] Int. Cl.$^5$ .............................................. G06K 7/08
[52] U.S. Cl. ................................... 235/449; 235/380; 235/493
[58] Field of Search ........................ 235/380, 449, 493

[56] References Cited

U.S. PATENT DOCUMENTS 4,650,978 3/1987 Hudson et al. ...................... 235/380
4,837,426 6/1989 Pease et al. ........................ 235/449

OTHER PUBLICATIONS

"The Complete Handbook of Magnetic Recording," Jorgensen, 1980, p. 65.

Primary Examiner—Harold Pitts
Attorney, Agent, or Firm—Davis Hoxie Faithfull & Hapgood

[57] ABSTRACT

Magnetic media containing data and method for data verification are disclosed. The data verification method utilizes the relative position of specific features of magnetic media signals, such as, peak zero crossings, the ratio of preselected amplitudes, the locii of preselected points along the signal, the RMS value of the waveform and the like. In the preferred embodiment, the ratio of the separation of adjacent pulses in the signal is employed. The deviation of the precise location of the placement of the peak points in the signal waveform is referred to as "jitter". This "jitter" is enhanced to provide a pattern of "jitter" or a magnetic "signature" that is random, non-reproducible and that can be used to positively identify a particular specimen of magnetic media and the associated data. The magnetic jitter pattern or security signature can be separate from or an integral part of the data recorded on the magnetic media. The data verification method and magnetic media have particular application in the field of credit cards.

12 Claims, 6 Drawing Sheets

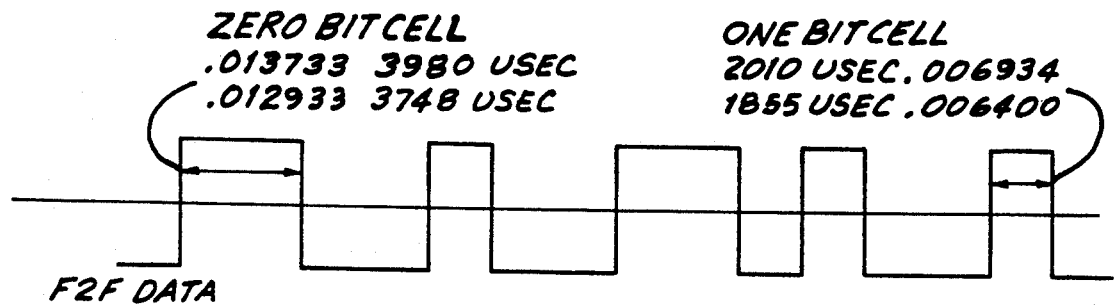
FIG. IA-A
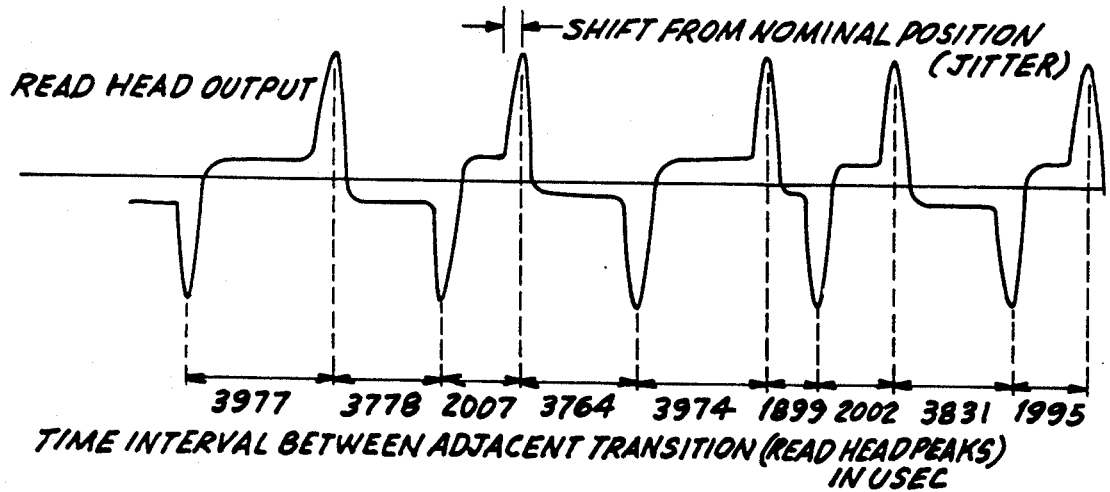
FIG. IA-B

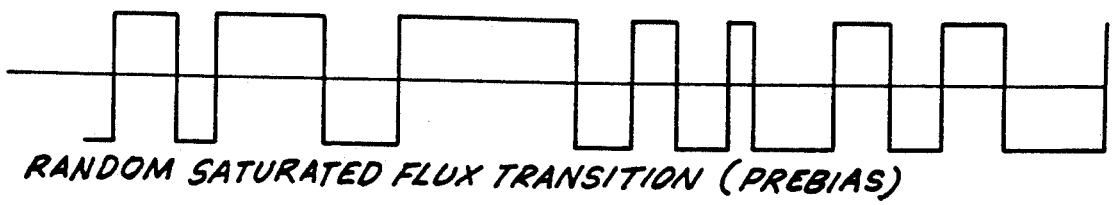
RANDOM SATURATED FLUX TRANSITION (PREBIAS)
FIG. IB-A
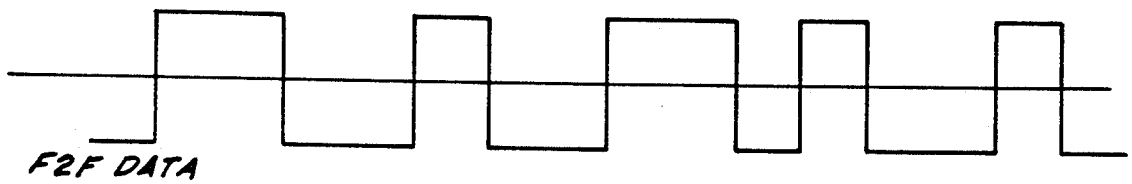
F2F DATA
FIG. IB-B
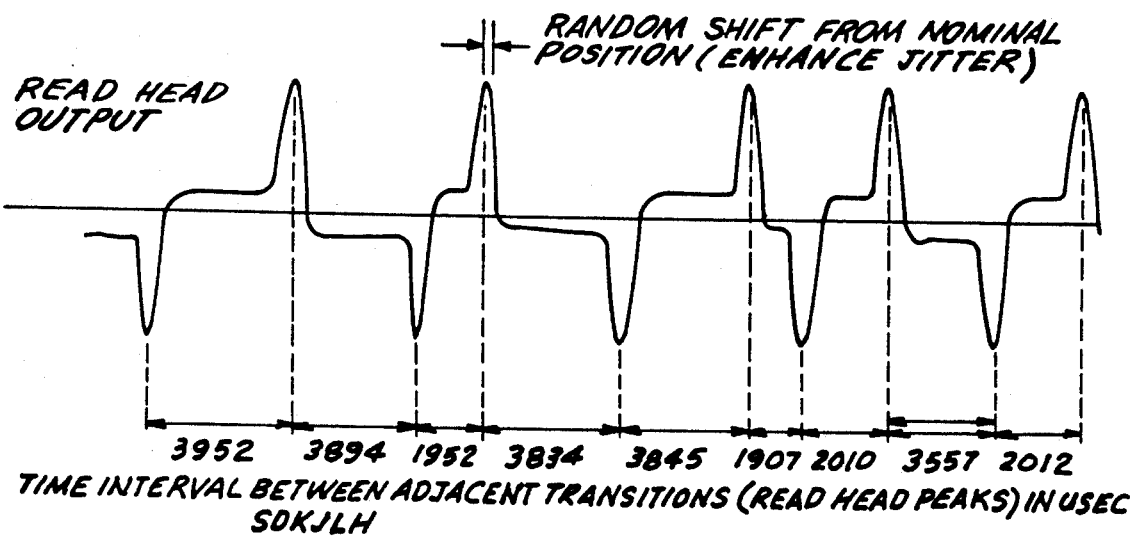
RANDOM SHIFT FROM NOMINAL POSITION (ENHANCE JITTER)
READ HEAD OUTPUT
3952  3894  1952  3834  3845  1907 2010  3557 2012
TIME INTERVAL BETWEEN ADJACENT TRANSITIONS (READ HEAD PEAKS) IN USEC
SDKJLH
FIG. IB-C
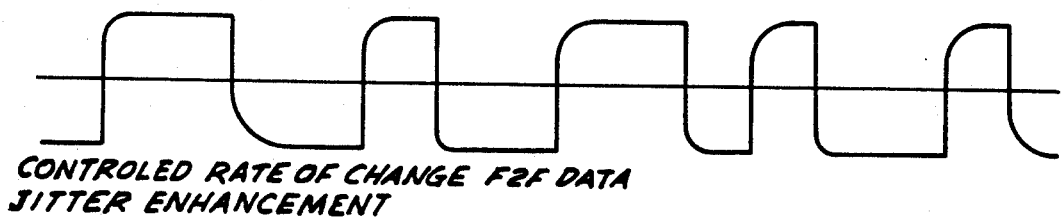
CONTROLED RATE OF CHANGE F2F DATA JITTER ENHANCEMENT
FIG. IC

DATA VERIFICATION METHOD AND MAGNETIC MEDIA THEREFOR

BACKGROUND OF THE INVENTION

The present invention relates to magnetic media in general, and more particularly, to magnetic media and method for data verification.

Counterfeiting and fraud with magnetic media have been known for a long time and various techniques to combat this crime have been employed. The "Watermark" technology by Malco/Thorn/EMI is an example of a magnetic security technology which has been available for a number of years. One of the disadvantages of the "Watermark" technology is that it requires special magnetic media to be manufactured with security features built in. This has proven to be too costly for any large scale employment of the technology.

Another security system for magnetic media is disclosed in U.S. Pat. No. 4,837,426 (426) by Pease, Copella, and Flannery. This system uses random variations in the amplitude of the output signal from a low noise amplifier reading the magnetic media to variations in the coercivity of any media to provide security data. Unfortunately this technique uses amplitude ratios to develop the security data so counterfeiting and copying may be relatively easily accomplished through the use of such techniques as high frequency bias recording.

Yet a third security system is disclosed in U.S. Pat. No. 4,650,978 ('978) by Hudson and Fernandez. The '978 patent teaches the use of the natural random variations in the magnetic properties of the media, caused by variations in coercivity, and granularity, coating thickness, surface profile and, most specifically, the random variations in the hysteresis of the medium and its past magnetic history to provide security. However, it involves the use of analog patterns which are complex and expensive and hard to analyze. Interfacing with existing systems is difficult because of space occupied on the circuit card, to fully utilize the technology. Furthermore, it requires the use of expensive circuitry such as A/D convertors.

It is accordingly a general object of the invention to provide a method for data verification and magnetic media therefor that overcomes the difficulties of the prior art methods and media.

It is a specific object of the invention to provide a data verification method and magnetic media that utilizes digital techniques to establish and decode a security magnetic sequence on and from the magnetic media.

It is a feature of the invention that the data verification method can be implemented with relatively inexpensive digital circuitry.

It is another feature of the invention that the reliability of data decoding is enhanced through the use of digital recording and processing techniques.

SUMMARY OF THE INVENTION

The present invention obviates the use of the amplitude of the analog patterns, as is taught in the previously mentioned '978 patent. In the present invention, the relative position of specific features of signals, such as peaks, zero crossings, the ratio of certain amplitudes, the position of certain points along the signal, the peak of area under the waveform, the RMS value of the waveform, and others are utilized. Of these features, the relative peak position is preferred. All these signals are derived from the output of a transducer such as, an electromagnetic induction transducer, Hall effect, magnetoresistive or optical transducer.

In the preferred embodiment the measurement of the ratio of the separation of adjacent peaks is employed. Time, distance and acceleration measurements also can be used to determine the ratio.

The deviation of the precise location of the placement of peak points is referred to as "jitter". This jitter is affected by many factors. Some of the significant factors are:

1. The timing regularity of the transport or swipe motion of the media;
2. The natural irregularities of the media caused by variations in coercivity, and granularity, coating thickness, and surface profile; and,
3. The magnetic history of the medium.

These variations are random and are not reproducible and they are unique to that particular specimen of media. The jitter also can be enhanced by recording signals in such a way that the hysteresis distortion effect on the placement of the feature such as a peak in the waveform is maximized. This enhanced jitter will be not only unique to that piece of media, but also to the specific recording event, since it also depends on the magnetic history of the media.

Several methods can be employed to enhance the jitter. Examples are to prerecord a series of random saturated flux transitions along the media, and to control the instantaneous rate of change of the flux through the region where the hysteresis distortion is the greatest. The exact position where the rate of change of flux is controlled will depend on type of erasure or prebiassing. A third way is to introduce a limited amount of deliberate random jitter.

This resulting pattern of jitter, can therefore be used to positively identify a particular specimen of media and with appropriate techniques, the associated data. In other words, the jitter pattern constitutes a unique magnetic security "signature".

The jitter can be represented in a variety of ways, for example:

1. A digital mapping of the total jitter or a sample of the jitter. Such mapping utilizes a table of all of the values of the jitter, or a sample of the jitter.

2. A "checksum" of quantities corresponding to the jitter. In this method a number is functionally derived from a number of the jitter quantities. Any of the weighted "checksum" or classical CRC functions can be used for this purpose. The "checksum" can be used to verify the validity of the data that has been checked in this manner, by storing it in a separate database or in a separate piece of media, or on the protected media itself. In the preferred embodiment a representation of the "checksum" is stored in the media itself, in a digital coding scheme or in another form that represents the value of the "checksum" itself, for example as the ratios of distances between clocking or data pulses within the data block or outside the boundaries of the data block or both.

3. Multiple "checksum" quantities corresponding to jitter in different regions of the media or the polarity sense of the transition. For example, if there are five of multiple "checksums", then only a specific number of valid "checksums" would indicate a valid card. The number of multiple checksums employed in a particular embodiment depends on the available data space on the medium in the application, and also on the processing power of the verification hardware. One example of a "checksum" representation system is a bipolar jitter "checksum" where the amount of jitter in alternating transitions is derived separately for several regions along the media, and then represented in the media in a different region as a ratio of the bipolar "checksums" and a clock pulse. This method is the preferred embodiment in several types of applications because of its intrinsic compensation for aging effects and equipment differences.

Card wear, and equipment tolerances are compensated for by allowing a range of checksum values around the expected "checksum" or "checksums".

Counterfeiting is prevented by this method, by either representing the checksum as an encrypted value, or a value that has been calculated by a one-way encryption algorithm.

Card copying (skimming) is prevented because the "checksum" is related to the magnetic properties of that specific card and the jitter pattern of the copy will be different from the original. The digital data may be successfully copied but it will not be validated by the original "checksum" which has been copied with the data.

In buffering fraud techniques, the data on the card is read and stored temporarily in some other media. After any value on the card is used up, the card is rewritten with the original contents. The present system prevents this type of fraud by basing the "checksum" not only on the physical properties of the card, but also on its magnetic history. Although the card in use is the same card, it has been modified and therefore the jitter pattern is different and a new "checksum" will not match the original.

Terminal hardware security is ensured by storing the critical operating parameters, such as any necessary encryption keys, algorithms and some code in devices with a tamper-proof memory such as the Signetics SC87C451 or a volatile memory which loses all data on tampering. Read/write terminals in the field cannot encode a card not previously encoded with a valid code. Blank cards can only be encoded on a master machine which is physically protected.

An embodiment which is ideally suited for application of this technology is a simple, secure and inexpensive terminal for home use, in credit card transactions. One of the large sources of fraud in credit card operations is merchant fraud in telephone transactions. Experimentation has shown that there is a sufficiently clear pattern of jitter even in standard cards which have not been encoded utilizing any of the jitter enhancements described previously, to identify any particular card (but with reduced security). This provides an easy migration path to derive some security by the use of the present technique, while on the way to providing full security implementation when all cards are encoded with the jitter enhancement, and the "checksum".

Such an inexpensive system may be placed in the home to read a card, for a telemarketing transaction. In operation, the customer calls a merchant on the telephone and makes the transaction. The merchant computer or network computer establishes an interchange of data with the home terminal using any standard modem or DTMF protocol. An encryption key is provided by the master computer either through the merchant computer or through the network. Each transaction has its own unique key, so that a recording of the telephone transaction cannot be used fraudulently. The key is good for one transaction and one transaction only. The customer swipes the card in the terminal and the terminal reads the data on the card using the digital decoding techniques described herein, and transmits the data using the unique encryption key to encrypt the data to the transaction processing computer. This data can comprise either the raw timing data for that card to be processed by the network computer, or the decoded data and "checksum". The network computer analyzes the data and by comparing the "checksum" derived for this transaction with previous values for that card, determines whether to allow the transaction to proceed or not. The merchant has no knowledge of the card number in this process, but receives an authorization from the network as usual.

BRIEF DESCRIPTION OF DRAWINGS

The objects and features of the present invention will best be understood from a detailed description of a preferred embodiment thereof, selected for purposes of illustration and shown in the accompanying drawings in which:

FIG. 1A is a waveform diagram of a standard recording and playback signal of a DC erased track;

FIG. 1B illustrates the waveform of FIG. 1A with the addition of a random pre-bias;

FIG. 1C depicts the waveform of FIG. 1A with a modified record signal to enhance jitter by means of transition rate control;

DETAILED DESCRIPTION OF THE INVENTION

Figure 2:
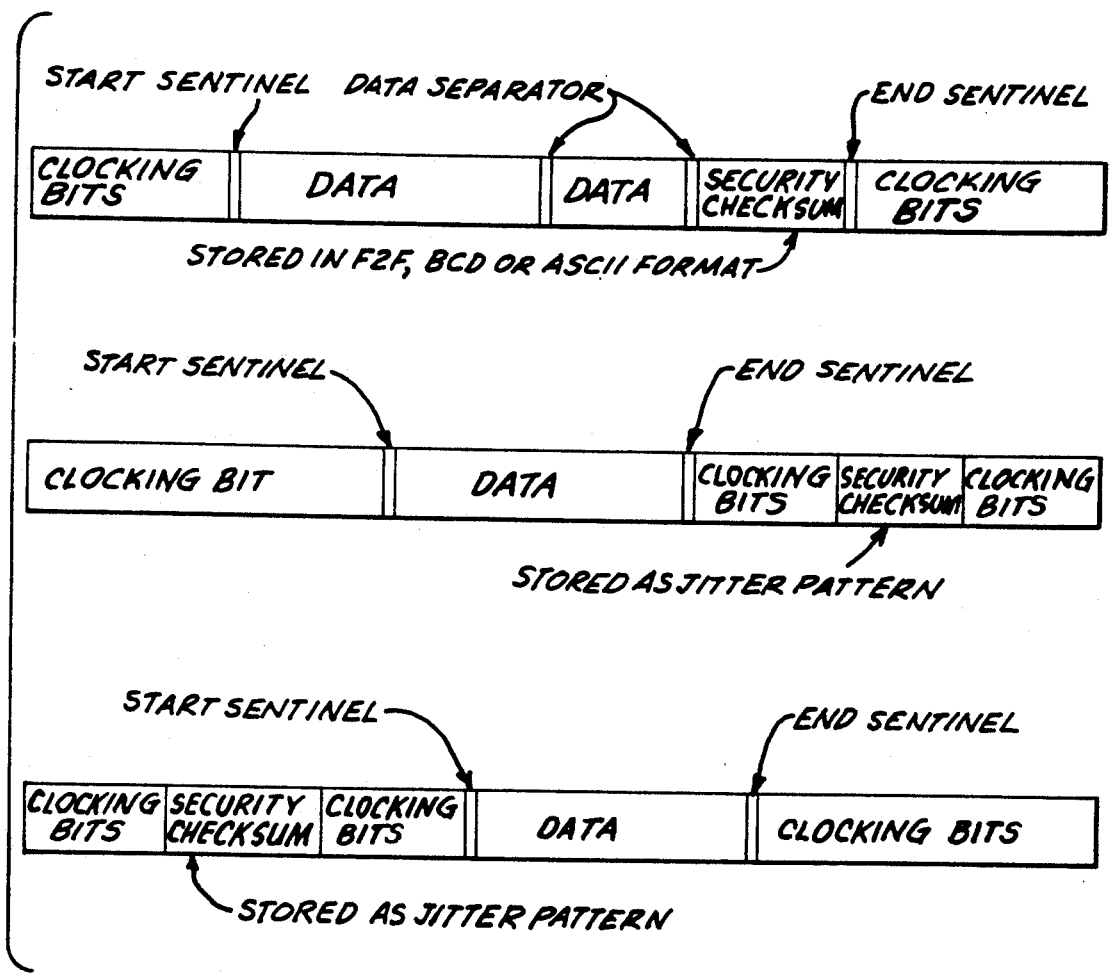
FIG. 2 is a diagram illustrating typical formats employed to store the "checksum" within the media.

Turning now to the drawings, and particularly to the FIGS. 1A-1C, these Figures illustrate waveforms based on reading a Standard ISO Track II magnetic stripe at three inches per second. It shold be understood that this track configuration and data density are selected only for purpose of illustration.

FIG. 1A-$a$ is a representation of a recording signal in Manchester F/2F code. FIG. 1A-$b$ is a representation of the read head output signal. For purposes of clarification some aspects of the waveform of FIG. 1A-$a$ have been exaggerated. FIG. 1A-$b$ is the resultant of recoding the waveform on a magnetic medium which has been erased previously by a DC signal. It should be noted that all transitions in the magnetic direction of the DC erase have a smaller jitter than those opposing the DC erase. However there is a random jitter also due to the physical characteristics of the medium. This amount of random jitter provides a modest amount of security when processed by the techniques described herein.

FIG. 1B shows the effect of random prebias according to the teachings of this invention. The signal a shown on FIG. 1B-$a$ is a random prebias used in place of the DC erase used in FIG. 1A. This is one embodiment of the security scrambling signal. FIG. 1B-$b$ is the recording signal as in FIG. 1A-$a$. Below that in FIG. 1B-$c$ is the resulting read signal output. The distribution of jitter along the media stripe is now more random, and is extremely difficult to copy because the prebias signal is not known by the perpretrator of fraud and the jitter would correspond to the sum of the effect of the physical characteristics and the history of the media due to the prebias. The jitter required to uniquely identify the medium and data using this technique is less than that allowed by the standards in use in the industry which is typically plus or minus 3%.

A method to further enhance non-reproducible jitter is shown in FIG. 1C. As the recording signal approaches the saturation region at the end of each transition, the rate of change of recording signal is slightly decreased to extend the time the flux transition remains on the knee, i.e., the most curved part of the hysterisis loop. This enhanced jitter must be controlled in encoding so that the jitter produced does not exceed allowable limits as above. It should be noted that although the use of this encoding technique reduces the magnitude of the peak output voltage from the head, the resultant waveforms are more consistent as they have a less variable peak shape from one pulse to another, and therefore produce more reliable decoding of the data.

It should be noted that the high resolution (0.2 microseconds or better) digital decoding technique used to derive the jitter pattern with sufficient accuracy to be effective for security, produces a much more reliable decoding of the data for normal use. The resolution required by the present security technique is ten times or more than the resolution normally used for normal digital decoding.

The "jitter" pattern constitutes the desired magnetic security signature. Using the "checksum" concept, the checksum can be stored in a variety of formats, several representative examples of which are depicted in FIG. 2.

Figure 3:
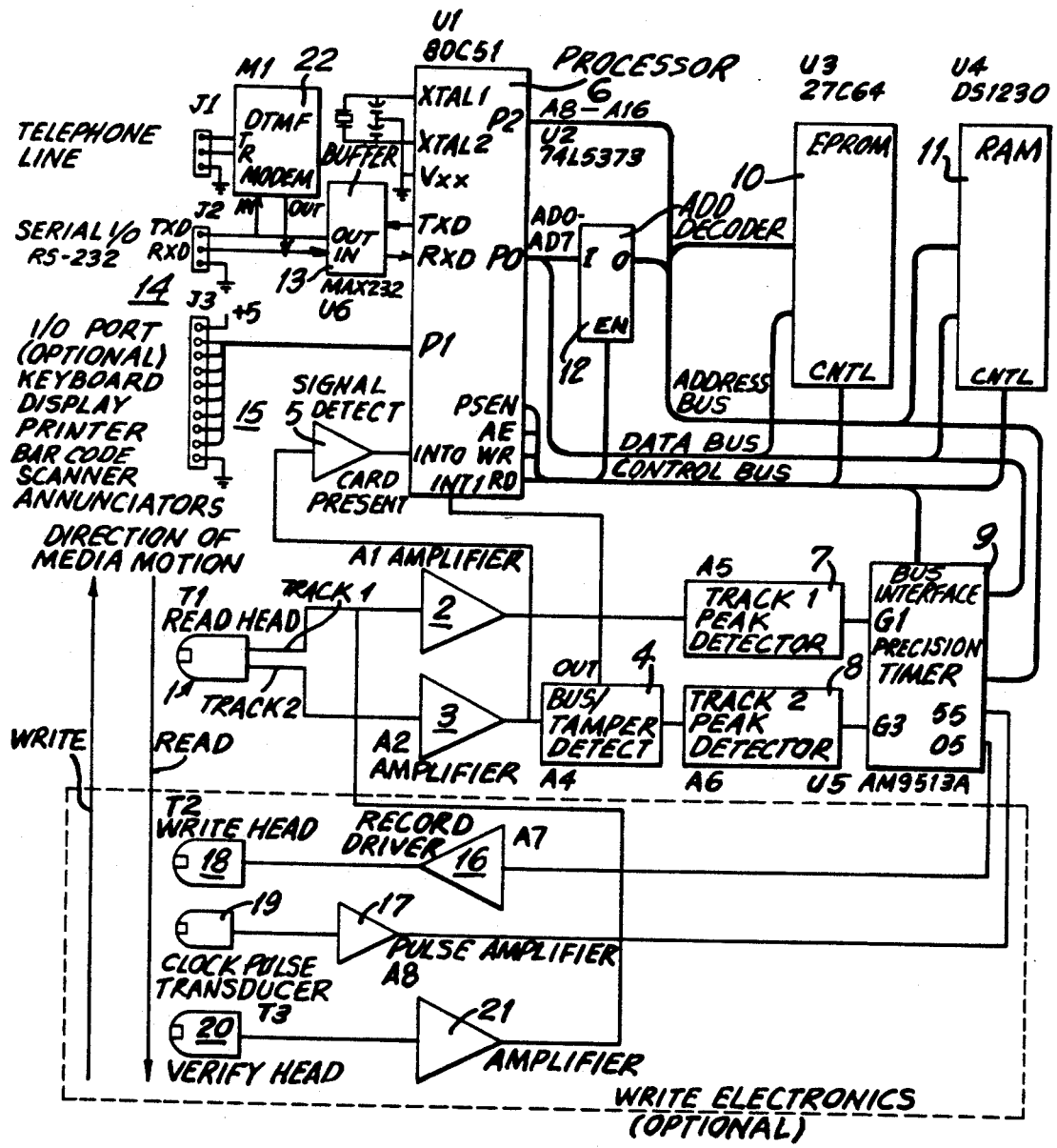
FIG. 3 is a block diagram of a read/write data verification system.

Referring now to FIG. 3, a card or any object with a magnetic region is moved past a magnetic read head 1. The output signals from read head 1 are amplified by amplifiers 2 and 3. The signal from the output of amplifier 3 is applied to level detector 5, which provides an interrupt to the processor or controller 6 to indicate that a card is present. This signal is also applied to bias detect circuitry 4, the details of which are described in the previously mentioned '978, the disclosure of which is incorporated herein by reference. If any bias is detected, an interrupt is issued to the processor 6 to indicate the presence of bias which constitutes an indication of tampering. The output signal of read amplifier 3 is fed to peak detector 8 which provides a strobe indicating a peak amplitude in the signal from the magnetic head. This strobe is fed to a gate input of timer 9 which then measures very precisely the interval from the previous strobe. The timer should have a resolution of at least 0.2 microseconds. This value is latched in the counter until the microprocessor 6 reads it. However, the timer recycles itself and begins counting the next pulse cycle immediately. The same procedure is applied to the signal from amplifier 2 if two tracks are to be read.

The processor 6 contains internal memory both for data and program storage, or alternately all or part of the program or working memory can be external to the processor. The external working memory is shown as 10 on the diagram, and the working memory as 11. In addition, there is an address decoder chip 12, which provides the addressing for the external memory if used. In the preferred embodiment, the programming included within the microcontroller comprises the security procedures and all of the low level input/output ("I/O") and maintenance utilities. The application software is stored in the external memory for ease of implementing different applications. The external working memory 11 is used to store immediate data just read from the card, the computed results, and any other application specific result. This memory can be volatile or non-volatile depending on the application. Such non-volatile memory can be used to store procedures downloaded by a host computer.

When the processor 6, receives an interrupt 0 from the level detector, 5, it immediately starts to read data from the timer and transfers it to the working memory one time interval measurement at a time. When all of the data from the time intervals on the card has been transferred to memory in this way, it receives a time out count from the timer 9, which overflows when no further peak is detected. The processor can now process the timing data, for one or more tracks. Alternately if a sufficiently fast processor is used, the data can be computed on-the-fly.

Figure 4A:
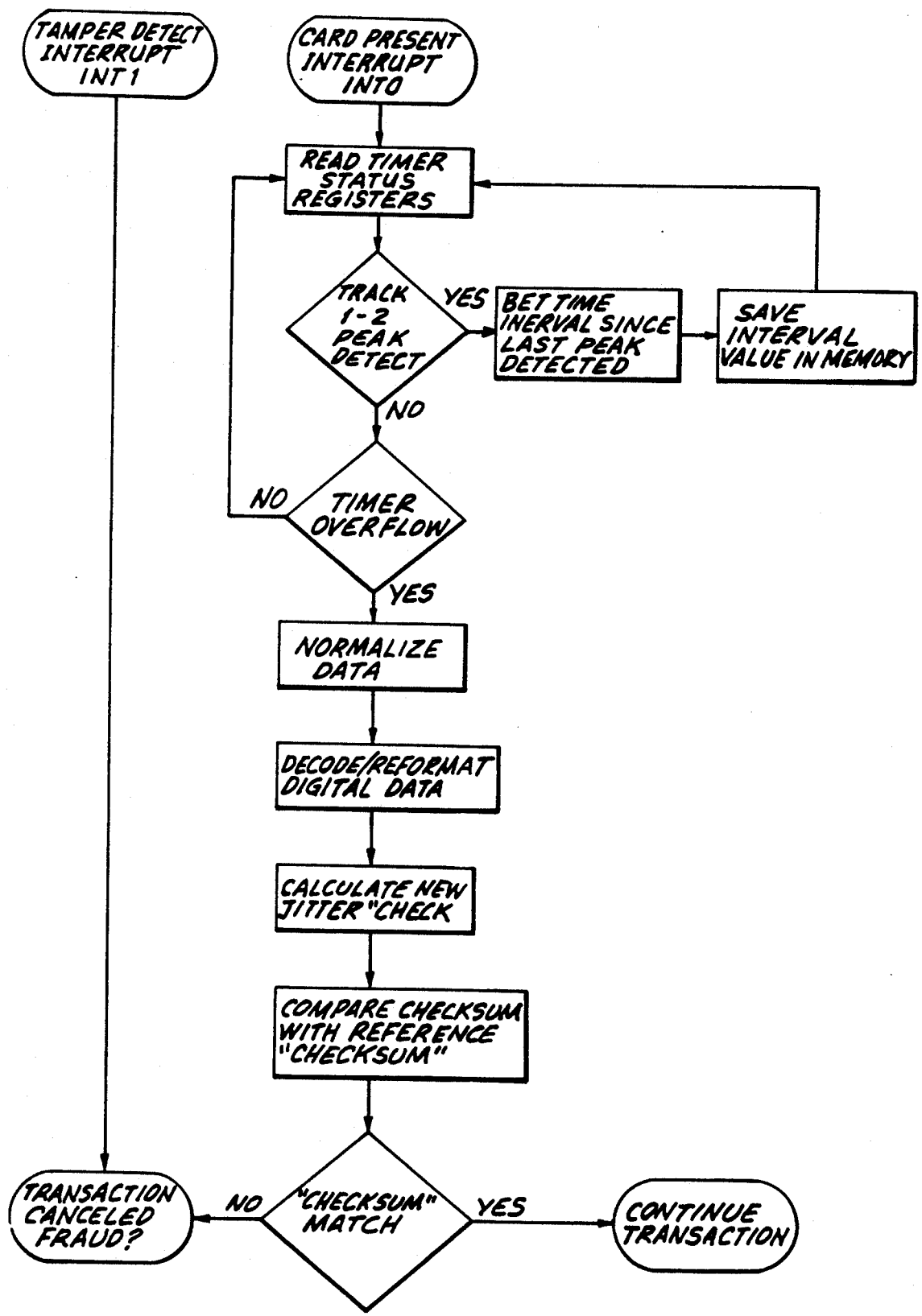
FIG. 4A is a flow diagram of the verification procedure for read only.
Figure 4B:
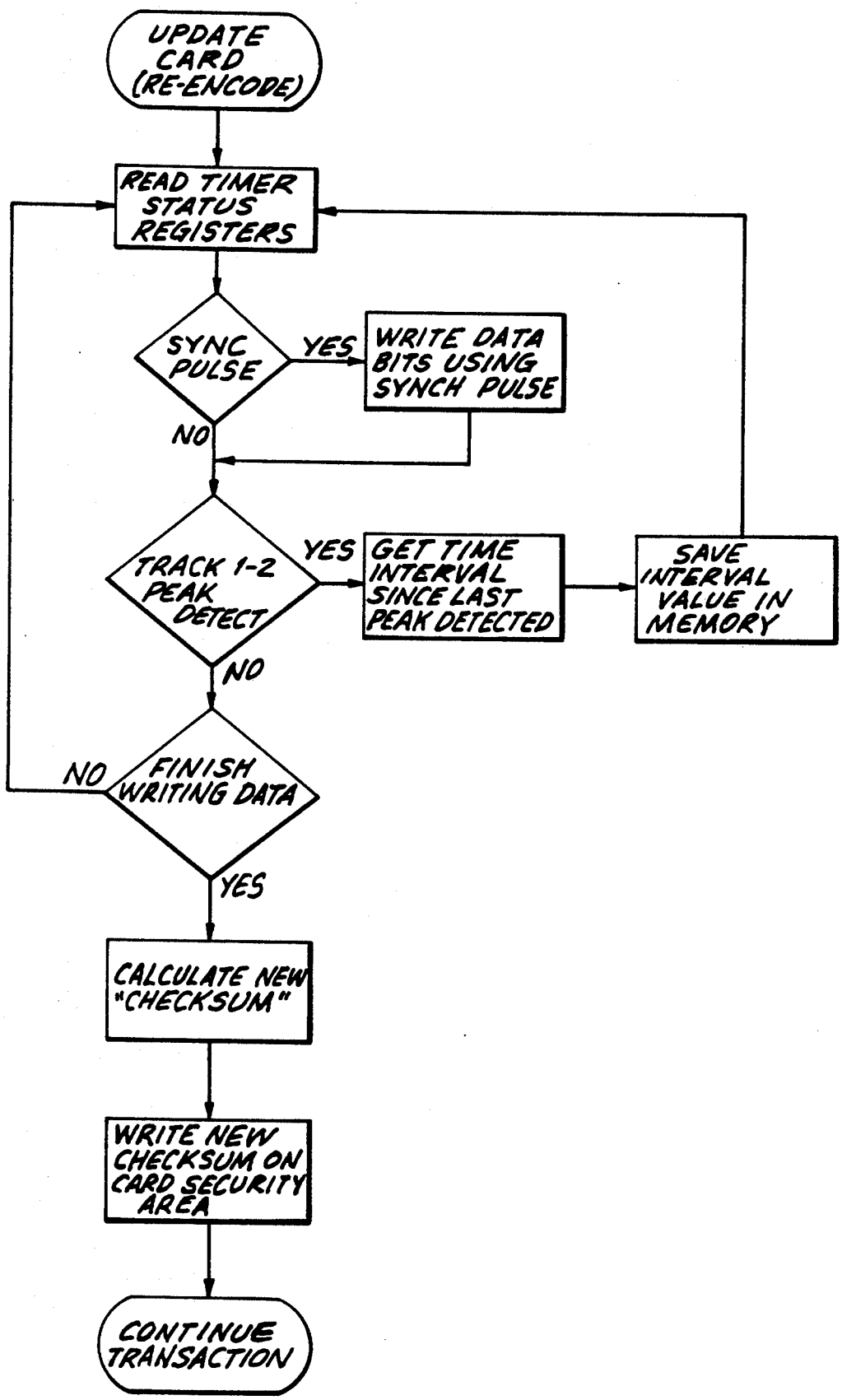
FIG. 4B is a flow diagram of the verification procedure for a read/write card with decrementing value.

Flow charts FIGS. 4A and 4B, show how the processor handles the timing interval data to determine whether the card is valid or not and how to proceed with the transaction. As a result, the processor communicates with a host computer either via a modem 12 or a serial port 13. A message is transmitted to the host computer in whatever protocol is relevant for the application, and a response is received which can be processed according to the specific application requirements, which may be as simple as presenting an authorization number or printing a voucher. An alternative is that in a stand-alone system, a decrementing value is computed, and the card is re-encoded as shown on flow chart 4B.

An optional I/0 port 15 is shown in FIG. 3, which can be used for accessories, such as a display, keyboard, printer, bar code scanner, annunciators or activators.

For applications requiring read/write capability such as decrementing value systems, FIG. 3 shows the necessary electronic circuitry. The data signal is fed to the record driver 16, amplified, and then fed to the write head 18. Device 19 is a clock pulse transducer, which reads a clocking track previously recorded on the media. An alternative is to use a mechanical position sensor which provides a series of clocking pulses as the media is moved past the record head. That signal is fed to the pulse amplifier 17, which sends it to a timer 9, where it is used to control the timing for the record signal. The embodiment depicted in FIG. 3 is the preferred embodiment for applications in which the card is swiped into a reader or, handled by a mechanical transport. In a swipe read/write application where the card motion will be in a single direction, the verify head 20, and amplifier 18, are required to verify the data after writing.

Having described in detail a preferred embodiment of my invention, it will now be apparent to those skilled in the art that numerous modifications can be made therein without departing from the scope of the invention as defined in the following claims.

What I claim is:

1. A method for generating a magnetic security signature on a magnetically recordable medium comprising the steps of:

A. producing a data representative signal to be recorded on said magnetically recordable medium; and, B. recording the data representative signal on the magnetically recordable medium while controlling the rate of change of the recording signal to extend the length of time that the magnetic flux transition remains on the most curved portion of the hysteresis loop of the magnetically recordable medium, whereby the magnetic security signature is enhanced by increasing the hysteresis during the recording of the data representative signal.

2. The method of claim 1 further comprising the steps of:
   A. determining a pattern of jitter in the recorded data representative signal;
   B. generating data representative of said pattern of jitter; and
   C. recording on said magnetically recordable medium said data representative of said pattern of jitter.

3. A method for identifying magnetically recordable medium having a data representative signal recorded thereon, said method comprising the steps of:
   A. determining an existing pattern of jitter by precisely determining relative time positions of specific signal variations in at least a portion of the recorded data representative signal;
   B. generating data representative of said existing pattern of jitter based on the determination of said relative time positions;
   C. determining subsequently a subsequently existing pattern of jitter in said at least a portion of the recorded data representative signal;
   D. generating data representative of said subsequently existing patter of jitter;
   E. comparing the data representative of said existing pattern of jitter and data representative of said subsequently existing pattern of jitter; and,
   F. utilizing the results of said data comparison, 4. The method of claim 3 wherein said data representative of said existing pattern of jitter is recorded on the particular magnetically recordable medium so that the comparison of Step E is made between the recorded data representative of said existing pattern of jitter and said data representative of said subsequently existing pattern of jitter.

5. A method for generating a magnetic security signature on a magnetically recordable medium comprising the steps of:
   A. pre-biasing the magnetically recordable medium by recording a pre-bias signal thereon that produces random saturated flux transitions on the magnetically recordable medium;
   B. recording a data representative signal on the pre-biased magnetically recordable medium to produce a composite signal containing jitter with at least a portion of the jitter being attributable to the effect of the pre-biasing of the magnetically recordable medium; and
   C. controlling during recording the rate of change of the recording data representative signal to extend the length of time that the magnetic flux transition remains on the most curved portion of the hysteresis loop of the magnetically recordable medium to further enhance the jitter, whereby the magnetic security signature is enhanced by increasing the hysteresis during the recording of the data representative signal.

6. A method for generating a magnetic security signature on a magnetically recordable medium comprising the steps of:
   A. pre-biasing the magnetically recordable medium by recording a pre-bias signal thereon that produces random saturated flux transitions on the magnetically recordable medium;
   B. recording a data representative signal on the pre-biased magnetically recordable medium to produce a composite signal containing jitter with at least a portion of this jitter being attributable to the effect of the pre-biasing of the magnetically recordable medium;
   C. controlling during recording the rate of change of the recording data representative signal to extend the length of time that the magnetic flux transition remains on the most curved portion of the hysteresis loop of the magnetically recordable medium to further enhance the jitter;
   D. determining a pattern of the jitter in the composite signal;
   E. generating data representative of said pattern of jitter; and
   F. recording on said magnetically recordable medium said data representative of said pattern of jitter, whereby the magnetic security signature is enhanced by increasing the hysteresis during the recording of the data representative signal.

7. A method for generating a magnetic security signature on a magnetically recordable medium comprising the steps of:
   A. determining a pattern of jitter by precisely determining relative time positions of specific signal variations in a recorded data representative signal;
   B. generating data representative of said pattern of jitter based on the determination of said relative time positions; and
   C. recording on said magnetically recordable medium said data representative of said pattern of jitter.

8. A method for identifying magnetically recordable medium having a first data representative signal recorded thereon, said method comprising the steps of:
   A. determining an existing pattern of jitter by precisely determining relative time positions of specific signal variations in at least a portion of the magnetically recordable medium in which the first recorded data representative signal is recorded;
   B. generating data representative of said existing pattern of jitter based on the determination of said relative time positions;
   C. writing a second data representative signal over the first data representative signal in said portion of the magnetically recordable medium to reflect a change of the data;
   D. determining subsequent to the writing of said second data a subsequently existing pattern of jitter in said portion of the magnetically recordable medium; and
   E. generating data representative of said subsequently existing pattern of jitter.

9. The method of claim 8 further comprising the steps of writing an additional data representative signal over the previously existing data signal each time a change of data occurs;
   F. determining subsequent to each said writing of additional data a new existing pattern of jitter; and
   G. generating representative data for each new existing pattern of jitter.

10. The method of claim 8 further comprising the step of encoding a signal representative said data representative of said existing pattern of jitter on a second portion of the magnetically recordable medium.

11. The method of claim 8 further comprising the step of encoding said data representative of said subsequently existing pattern of jitter.

12. The method of claim 10 further comprising the steps of redetermining the existing pattern of jitter prior to writing said second data representative signal;
retrieving the encoded signal; and
comparing the encoded signal and the redetermined existing pattern of jitter.

* * * * *